United States Patent
Mackin et al.

(10) Patent No.: US 10,626,801 B2
(45) Date of Patent: Apr. 21, 2020

(54) METHODS AND APPARATUS TO ADJUST BLEED PORTS ON AN AIRCRAFT ENGINE

(71) Applicant: The Boeing Company, Chicago, IL (US)

(72) Inventors: Steve G. Mackin, Bellevue, WA (US); Sean C. Thomas, Everett, WA (US); Brian W. Debronsky, Seattle, WA (US)

(73) Assignee: The Boeing Company, Chicago, IL (US)

( * ) Notice: Subject to any disclaimer, the term of this patent is extended or adjusted under 35 U.S.C. 154(b) by 277 days.

(21) Appl. No.: 15/489,383

(22) Filed: Apr. 17, 2017

(65) Prior Publication Data

US 2017/0218853 A1    Aug. 3, 2017

Related U.S. Application Data

(62) Division of application No. 14/189,846, filed on Feb. 25, 2014, now Pat. No. 9,657,647.

(Continued)

(51) Int. Cl.
*F02C 9/18* (2006.01)
*F04D 27/02* (2006.01)
(Continued)

(52) U.S. Cl.
CPC ............... *F02C 9/18* (2013.01); *B64D 13/02* (2013.01); *B64D 15/04* (2013.01); *B64D 27/16* (2013.01);
(Continued)

(58) Field of Classification Search
CPC ... F02C 9/18; F02C 6/08; B64D 13/02; B64D 13/04; B64D 27/16; B64D 15/04;
(Continued)

(56) References Cited

U.S. PATENT DOCUMENTS 2,850,227 A * 9/1958 Wheatley ............ F04D 27/0215
                                                        415/145
2,863,288 A    12/1958 Martin
(Continued)

FOREIGN PATENT DOCUMENTS

| DE | 3313321 | 10/1984 |
| EP | 1531236 | 5/2005 |
| EP | 1923553 | 5/2008 |

OTHER PUBLICATIONS

United States Patent and Trademark Office, "Non-Final Office Action," issued in connection with U.S. Appl. No. 14/189,846, dated Sep. 9, 2016, 32 pages.

(Continued)

*Primary Examiner* — Moshe Wilensky
*Assistant Examiner* — Jesse M Prager
(74) *Attorney, Agent, or Firm* — Hanley, Flight & Zimmerman, LLC

(57) ABSTRACT

An example method to extract bleed air from an aircraft engine includes extracting, via a plenum positioned in a compressor of the aircraft engine, bleed air from a first bleed port associated with a first stage of a compressor and a second bleed port associated with a second stage of the compressor. The plenum is configured to combine the extracted bleed air from the first and second bleed ports and fluidly couple the extracted bleed air to one or more systems of an aircraft. The method includes regulating a pressure of the extracted bleed air in the plenum by adjusting a flow of bleed air through the first bleed port via a first valve associated with the first bleed port and adjusting a flow of bleed air through the second port via a second valve associated with the second bleed port.

20 Claims, 13 Drawing Sheets

Related U.S. Application Data

(60) Provisional application No. 61/891,283, filed on Oct. 15, 2013.

(51) Int. Cl.

| | | |
|---|---|---|
| *F02C 6/08* | (2006.01) | |
| *F01D 17/10* | (2006.01) | |
| *B64D 13/02* | (2006.01) | |
| *B64D 15/04* | (2006.01) | |
| *B64D 27/16* | (2006.01) | |
| *F04D 27/00* | (2006.01) | |

(52) U.S. Cl.
CPC ............... *F01D 17/105* (2013.01); *F02C 6/08* (2013.01); *F04D 27/009* (2013.01); *F04D 27/023* (2013.01); *F04D 27/0215* (2013.01); *F05D 2270/60* (2013.01); *F05D 2270/65* (2013.01)

(58) Field of Classification Search
CPC .. F04D 27/009; F04D 27/023; F04D 27/0215; F01D 17/105; F05D 2270/60; F05D 2270/65
See application file for complete search history.

(56) References Cited

U.S. PATENT DOCUMENTS

| | | | |
|---|---|---|---|
| 3,062,237 A | 11/1962 | Coplen, Jr. | |
| 3,074,432 A | 1/1963 | Beale et al. | |
| 4,086,761 A * | 5/1978 | Schaut | F02C 7/045 |
| | | | 60/226.1 |
| 4,344,282 A | 8/1982 | Anders | |
| 4,627,789 A | 12/1986 | Petro et al. | |
| 5,351,473 A | 10/1994 | Shuba | |
| 6,438,941 B1 | 8/2002 | Elliott et al. | |
| 6,742,324 B2 | 6/2004 | Bachelder et al. | |
| 6,938,407 B2 | 9/2005 | Beutin et al. | |
| 7,059,136 B2 | 6/2006 | Coffinberry | |
| 7,594,403 B2 | 9/2009 | Cadieux | |
| 7,624,581 B2 | 12/2009 | Moniz | |
| 8,690,521 B2 * | 4/2014 | Colotte | F01D 17/16 |
| | | | 415/149.4 |
| 2012/0275912 A1 | 11/2012 | Moniz et al. | |
| 2013/0340441 A1 | 12/2013 | Little et al. | |
| 2015/0104289 A1 | 4/2015 | Mackin et al. | |
| 2016/0123237 A1 * | 5/2016 | Spagnoletti | F02C 7/14 |
| | | | 60/776 |

OTHER PUBLICATIONS

United States Patent and Trademark Office, "Notice of Allowance," issued in connection with U.S. Appl. No. 14/189,846, dated Dec. 27, 2016, 16 pages.

\* cited by examiner

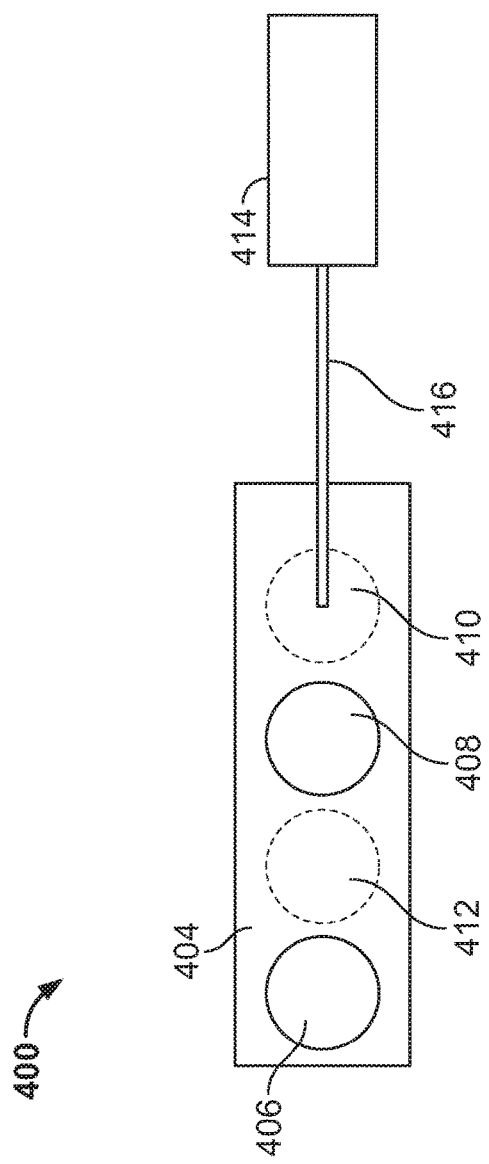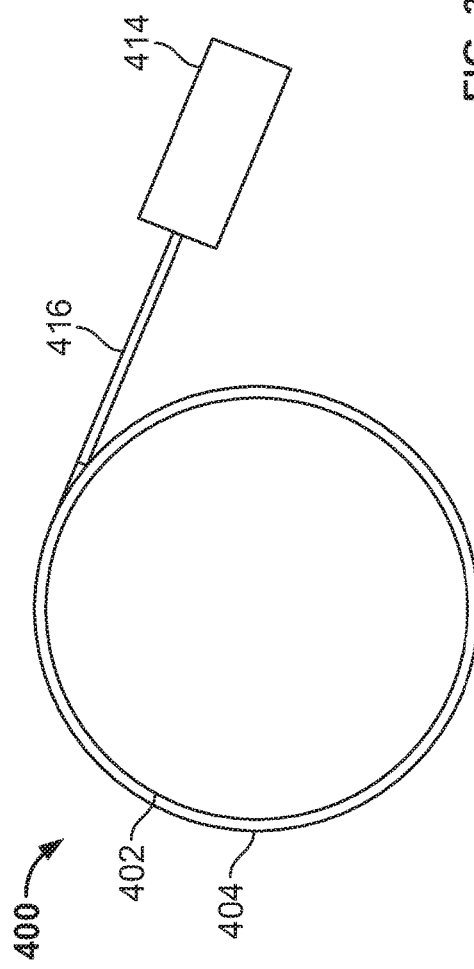

METHODS AND APPARATUS TO ADJUST BLEED PORTS ON AN AIRCRAFT ENGINE

RELATED APPLICATION

This patent arises from a continuation of U.S. patent application Ser. No. 14/189,846, filed Feb. 25, 2014, which claims priority to U.S. Provisional Patent Application No. 61/891,283, filed Oct. 15, 2013. Both U.S. patent application Ser. No. 14/189,846 and U.S. Provisional Patent Application No. 61/891,283 are hereby incorporated herein by reference in their entireties.

BACKGROUND

Aircraft typically include at least one power plant, such as a gas turbine. A turbofan engine is a type of a gas turbine that includes an inlet at a forward portion of the engine for providing air to the fan and compressor portion of the engine. The compressor may be a multi-stage compressor. Air is compressed in the compressor and the compressed air passes into a combustion chamber where it is combusted with fuel and used to drive the turbine portion of the engine. After passing through the turbine portion, the exhaust is passed through a nozzle located at the aft portion of the engine. Some turbofan engines may include two compressors (e.g., a low-pressure compressor and a high-pressure compressor) each driven independently by two different shafts coupled to two different turbines.

BRIEF DESCRIPTION OF THE DRAWINGS

FIG. 3A shows a top view of an example valve that can be used to control fluid flow through bleed ports of a compressor and/or a turbofan engine in accordance with the teachings of this disclosure.

FIG. 3B shows a cross-sectional view of the example valve of FIG. 3A.

The figures are not to scale. Wherever possible, the same reference numbers will be used throughout the drawing(s) and accompanying written description to refer to the same or like parts.

DETAILED DESCRIPTION

Turbofan engines may include systems for bleeding air from the engine for use by various aircraft systems (e.g., an environmental control system (ECS)). Bleed air may be extracted after passing through the compressor but prior to injecting fuel into the air. In multi-stage compressors, bleed air may be taken from predetermined stages of the compressor, such as, the $2^{nd}$ and $7^{th}$ stages. Existing engines may be configured to bleed air from one or more predetermined stages prior to installation and/or use on the aircraft and are not easily reconfigurable to change the bleed stage(s).

An advantage for using pressurized bleed air is the decrease in the loading of or need for air generators that may otherwise be needed to provide air for cabin pressurization, anti-icing functionality, and others. However, a disadvantage of bleed air is an overall reduction in thrust. To balance such competing interests, there may be a need for improved systems which enable further control over the bleeding or extraction of air from the engine.

The examples disclosed herein relate generally to gas turbine engines (e.g., turbofan engines), which may enable substantial fuel burn savings for low occupant and/or other occupant level aircrafts. More particularly, the examples disclosed herein relate to adjustable and/or incrementally adjustable bleed stage apparatuses and/or bleed port selection mechanisms for compressors of turbofan engines. Using the examples disclosed herein, the performance of such engines may be increased by selecting, tailoring and/or optimizing the bleed stage prior to and/or while operating the engine. Thus, using the disclosed examples, a bleed stage can be adjusted and/or selected prior to operating the engine without the relatively expensive reconfiguration associated with some systems.

Figure 1:
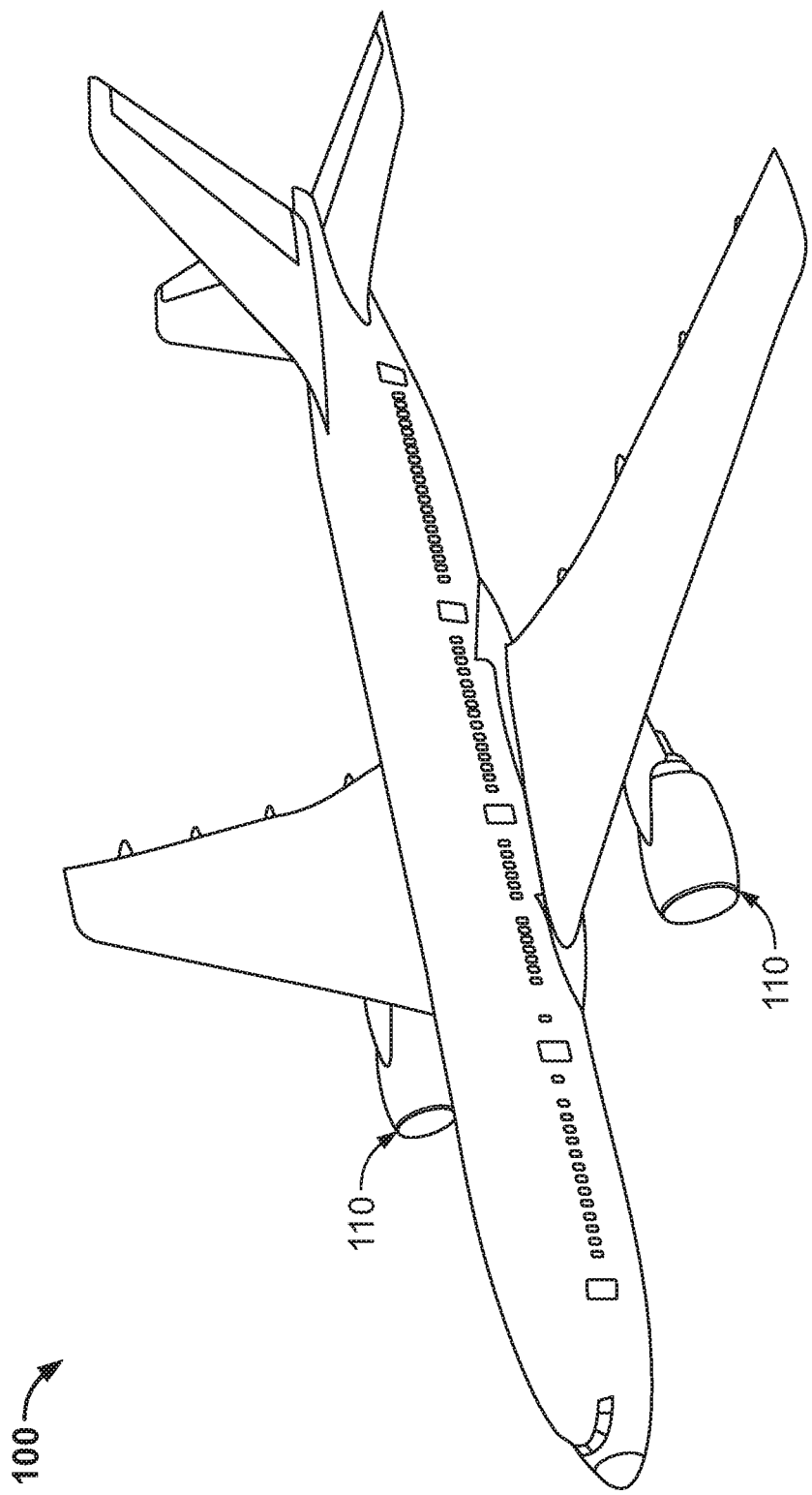
FIG. 1 shows an aircraft including an engine with an example adjustable bleed stage apparatus according to the examples disclosed herein.

Example adjustable bleed stage apparatuses and/or bleed port selection mechanisms according to the present disclosure may be incorporated into any aircraft or other mobile platforms which uses, for example, a gas turbine as a power plant. For example, the aircraft may be a commercial transport aircraft 100 as shown in FIG. 1. The aircraft 100 may include one or more propulsion units (e.g., turbofan engines 110), which include an adjustable bleed stage apparatus and/or a bleed port selection mechanism according to examples disclosed herein.

Figure 2:
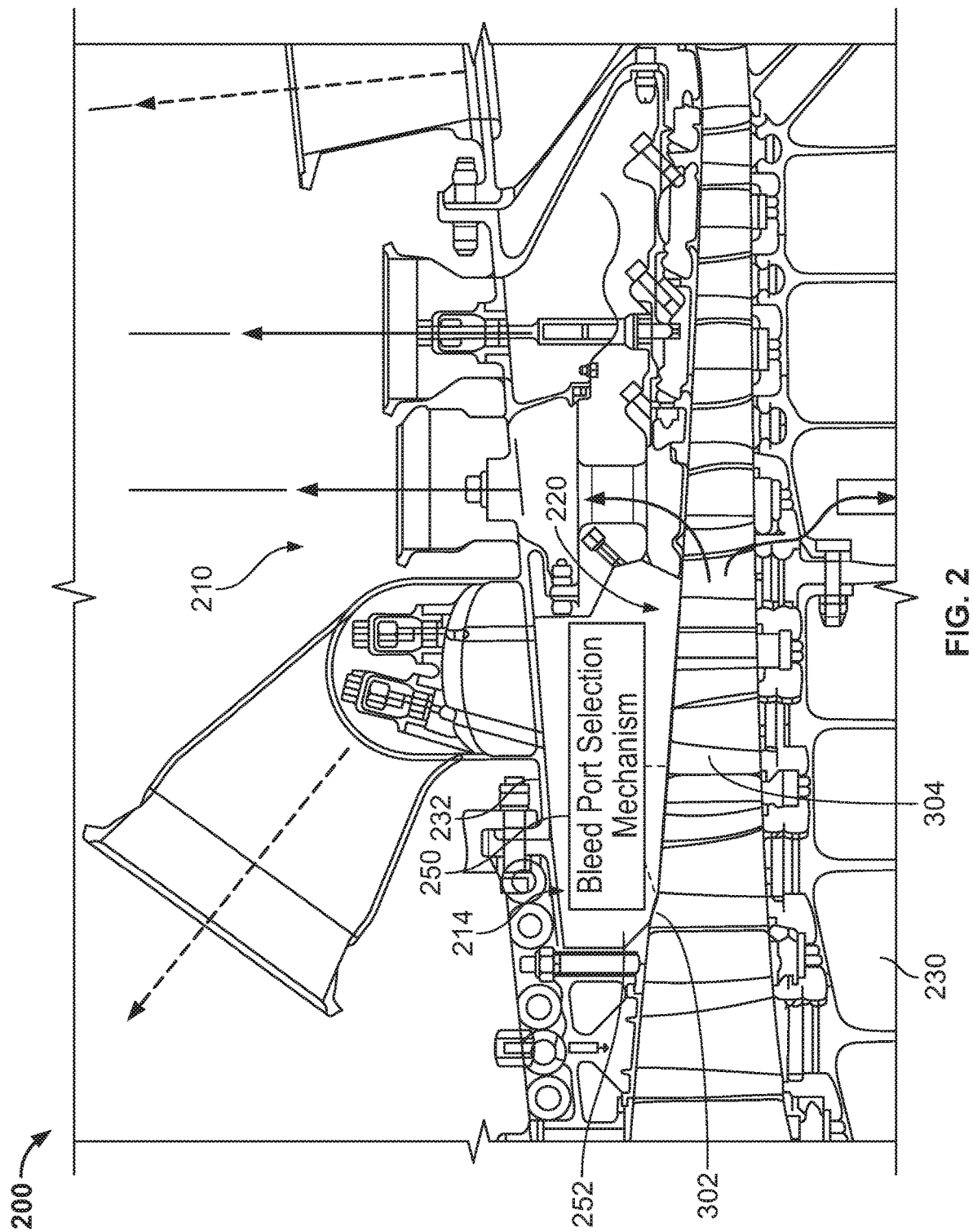
FIG. 2 shows an example turbofan engine including an example adjustable bleed port selection mechanism that can be used to implement the examples disclosed herein.

FIG. 2 shows a partial cross section of a turbofan engine 200 according to some examples disclosed herein. As described herein, a compressor 210 of the turbofan engine 200 may include a low-pressure compressor at a forward portion of the turbofan engine 200 and a high-pressure compressor 214 downstream of the low-pressure compressor with multiple rows or stages 220 comprising rotating blades and stator vanes. The compressor 210 may be enclosed within a housing or compressor case 230 and a plenum 232 may be connected to the compressor case 230 to define a plenum cavity 252.

In the illustrated example of FIG. 2, the high-pressure compressor 214 includes a 4$^{th}$ stage associated with a first bleed port 302 that may be used when the aircraft 100 has lower occupancy and a 5$^{th}$ stage associated with a second bleed port 304 that may be used when the aircraft 100 has higher occupancy. In some examples, as used herein, occupants of the aircraft 100 include people, passengers, crew, crew rests, cargo, heating and cooling systems, other options using engine bleed air, etc.

FIG. 2 also illustrates an example bleed port adjustment apparatus and/or a bleed port selection mechanism 250 according to the present disclosure. The bleed port selection mechanism 250 of the example of FIG. 2 is positioned in the plenum cavity 252 and can be used to adjust and/or select a bleed stage for extracting bleed air from the compressor 210 of the turbofan engine 200. In some examples, the bleed port selection mechanism 250 includes valves positioned at one or more compressor stages (e.g., a fourth stage, a fifth stage, etc.) of the engine, as will be further described. In the illustrated examples, the valves include first and second plates, a bleed band(s), sleeves and/or valves that are movable relative to one another to enable more or less fluid to flow through an aperture(s) and/or bleed aperture(s) defined by the respective plates and/or the corresponding bleed ports. In some examples, the plates are manually, automatically, linearly and/or rotatably movable relative to one another. In examples in which the bleed port selection mechanism 250 includes one or more bleed band(s), the bleed band may be moveable between a first position blocking a first bleed port to a second position blocking a second bleed port. In some examples, the bleed band may be moved to cover and/or not cover one or more bleed ports of a stage (e.g., 4$^{th}$ stage, 5$^{th}$ stage) of the compressor 210. To assist in moving and/or guiding the movement of the first and second plates, a bleed band(s), sleeves, etc. (e.g., portions of the example valves), the example valves as disclosed herein may include one or more guides, guide rails, etc.

In examples in which the bleed stage apparatus includes one or more plates, for a particular stage, a desired bleed port flow path may be obtained by moving a first plate relative to a second plate to enable one or more first apertures of the first plate to be aligned and/or positioned relative to corresponding second apertures of the second plate. For example, coaxially aligning the first and second apertures increases the fluid flow through the apertures while off-setting the first and second apertures decreases the fluid flow through the apertures. In examples in which more than one set of plates are provided, one of the first plates may be independently and/or simultaneously movable and/or controllable relative to another one of the first plates.

FIGS. 3A and 3B illustrate different views of an example bleed port adjustment apparatus 400 that can be used to implement the bleed port selection mechanism 250 of FIG. 2. FIG. 3A illustrates a top partial view of the bleed port adjustment apparatus 400 and FIG. 3B shows a front and/or cross-sectional view of the bleed port adjustment apparatus 400. The example bleed port adjustment apparatus 400 includes first and second concentric sleeves, cylinders and/or arched portions 402, 404. The first sleeve 402 may include one or more first apertures (e.g., apertures 406, 408), and the second sleeve 404 may include one or more second apertures (e.g., apertures 410, 412). Any number of first apertures and/or second apertures may be provided in the sleeves 402, 404, respectively, along the radial direction or circumference of each sleeve. The illustrations of the bleed port adjustment apparatus 400, including the size, shape, etc. of the aperture 406, 408, 410, 412, are provided for illustration only and may not be to scale.

In some examples, the first apertures 406, 408 of the first sleeve 402 may be in fluid communication with one or more bleed ports (e.g., the bleed port 302) formed in the compressor case 230. In some examples, the first sleeve 402 may be fixed and the second sleeve 404 may be movable relative to the first sleeve 402. For example, the second sleeve 404 may be radially slidable or rotatable about the first sleeve 402 and/or other fixed components of the turbofan engine 200 and/or the compressor case 230. As shown in FIG. 3B, the bleed port adjustment apparatus 400 may be coupled to an actuator 414 such as, for example, a hydraulic actuator, an electrical motor or any other suitable device to actuate/move the bleed port adjustment apparatus 400. In the illustrated example, to adjust the positions of the apertures 406, 408 relative to the apertures 410, 412, the actuator 414 moves and/or rotates the second sleeve 404 relative to the first sleeve 402, e.g. via a control rod 416.

Figure 4:
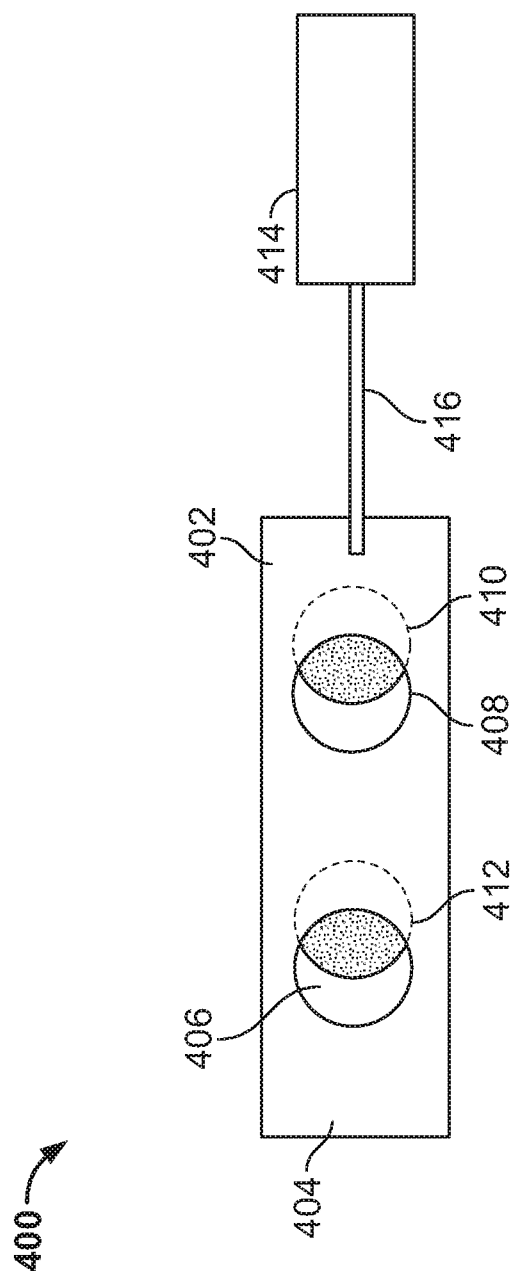
FIG. 4 shows another top view of the example valve of FIG. 3A with the valve in an intermediate position.

In operation, the second sleeve 404 may be movable from a first position in which the second apertures 410, 412 are in fluid communication and/or aligned with the bleed ports 302 and/or 304 (e.g., fully open position) to a second position in which the second apertures 410, 412 are not fluidly coupled to and/or aligned with the bleed ports 302 and/or 304 (e.g., fully closed position). The second sleeve 404 may be movable to any intermediate position to position the second apertures 410, 412 between the fully open and fully closed positions. In further examples, the movable and stationary sleeves may be reversed such that the first sleeve 402 is movable and the second sleeve 404 is fixed and adjustment of the bleed stage is achieved by moving/rotating the first sleeve 402 relative to the second sleeve 404 and/or other fixed components of the engine (e.g., the compressor casing). In such examples, the second sleeve 404 may include one or more slots through which posts extend that couple the second sleeve 404 to the compressor case 230. Additionally or alternatively, in such examples, the second sleeve 404 may include a slot and/or aperture to enable the actuator 414 to couple to the first sleeve 402 to enable the actuator 414 to move and/or rotate the first sleeve 402 relative to the bleed ports 302 and/or 304. FIG. 4 shows the apertures 406, 408, 410, 412 of the sleeves 402, 404 at least partially aligning, thereby enabling fluid flow therethrough.

Figure 5:
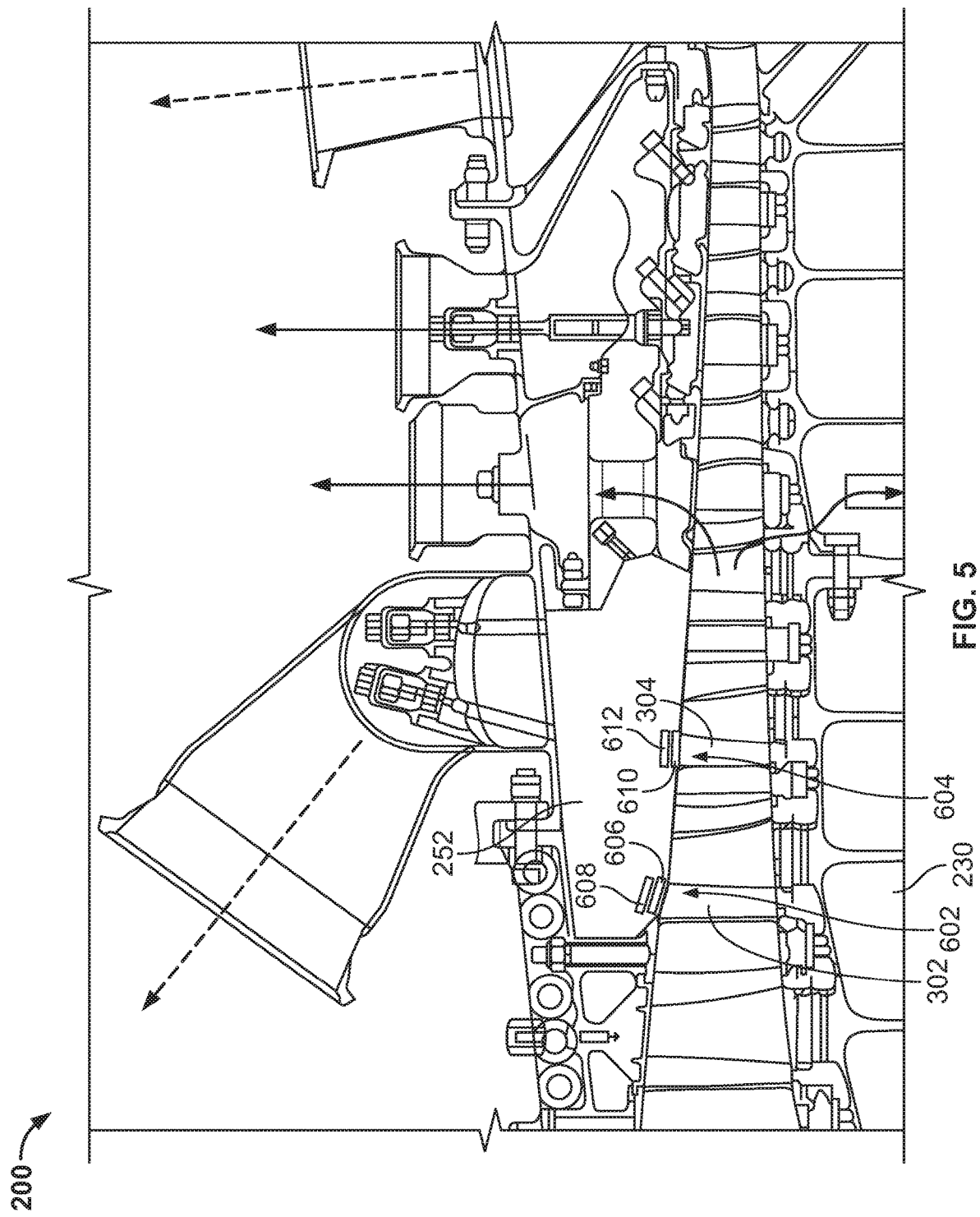
FIG. 5 shows example valves implemented on an example compressor in accordance with the teachings of this disclosure.

FIG. 5 shows an example turbofan engine 200 including a first valve 602 and a second valve 604 that can be used to implement the bleed port selection mechanism 250 of FIG. 2. In the illustrated example, the first valve 602 includes first and second concentric arcs and/or sleeves 606, 608 and the second valve 604 includes third and fourth concentric arcs and/or sleeves 610, 612. In some examples, the first sleeve 606 is movable relative to the second sleeve 608 to enable fluid flow through the bleed port 302 and into the plenum cavity 252. In some examples, the third sleeve 610 is movable relative to the fourth sleeve 612 to enable fluid flow through the bleed port 304 and into the plenum cavity 252. In some examples, the valves 602, 604 include guides and/or rails to guide the movement and/or rotation of the sleeves 606, 608, 610, 612.

Figure 6:
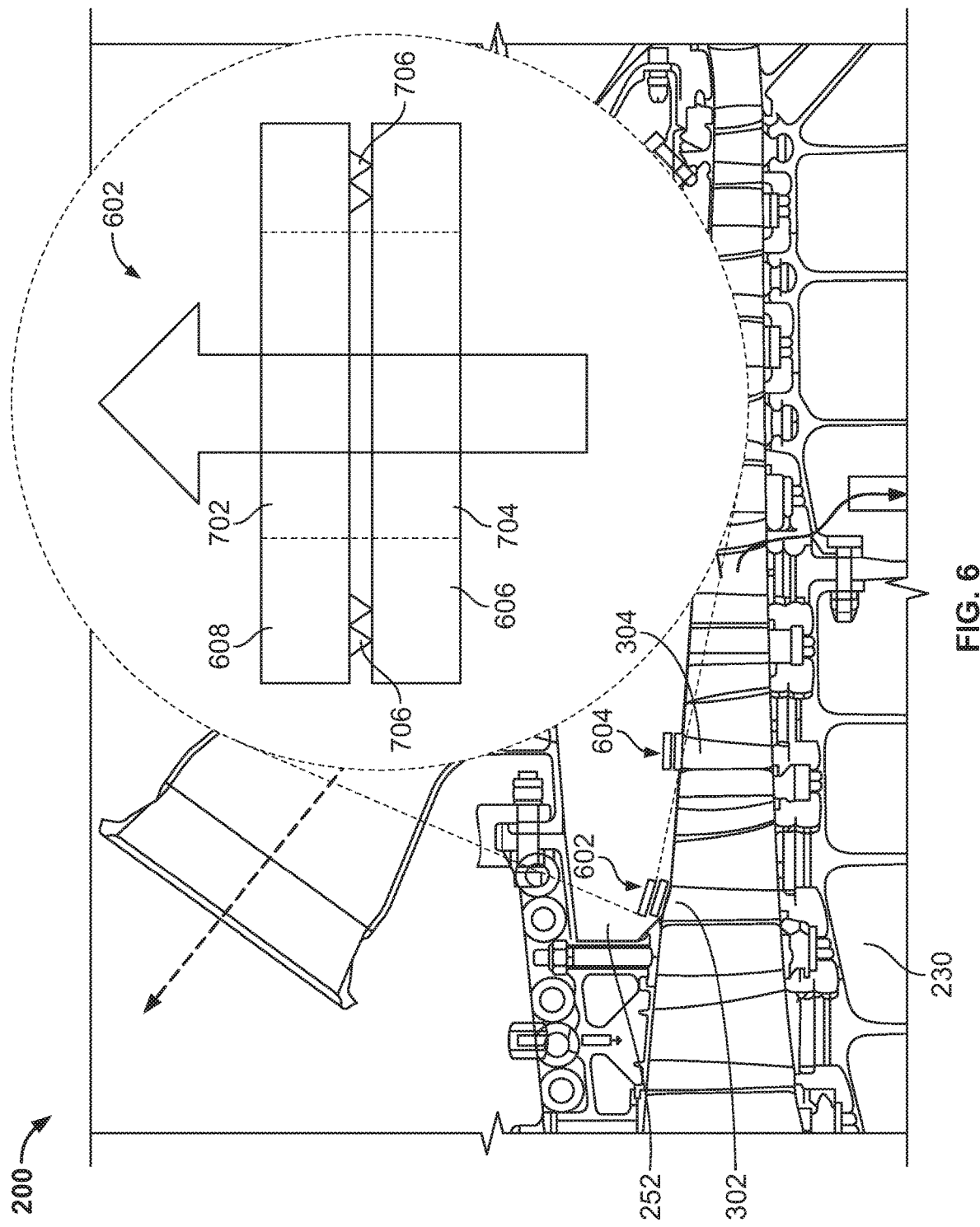
FIG. 6 shows a detailed view of a first valve implemented on the example compressor of FIG. 5.

FIG. 6 shows an enlarged view of the first valve 602. As shown, the first valve 602 includes the first and second concentric sleeves 606, 608 that define apertures 702, 704 through which fluid flows when the apertures 702, 704 are aligned. FIG. 6 also shows a seal(s) 706 positioned between the sleeves 606, 608 and on either side of the apertures 702, 704 that substantially prevents fluid flow between the first and second concentric sleeves 606, 608. In the illustrated example, the seal 706 is a labyrinth seal. However, in other examples, the seal 706 may be any other suitable seal.

Figure 7:
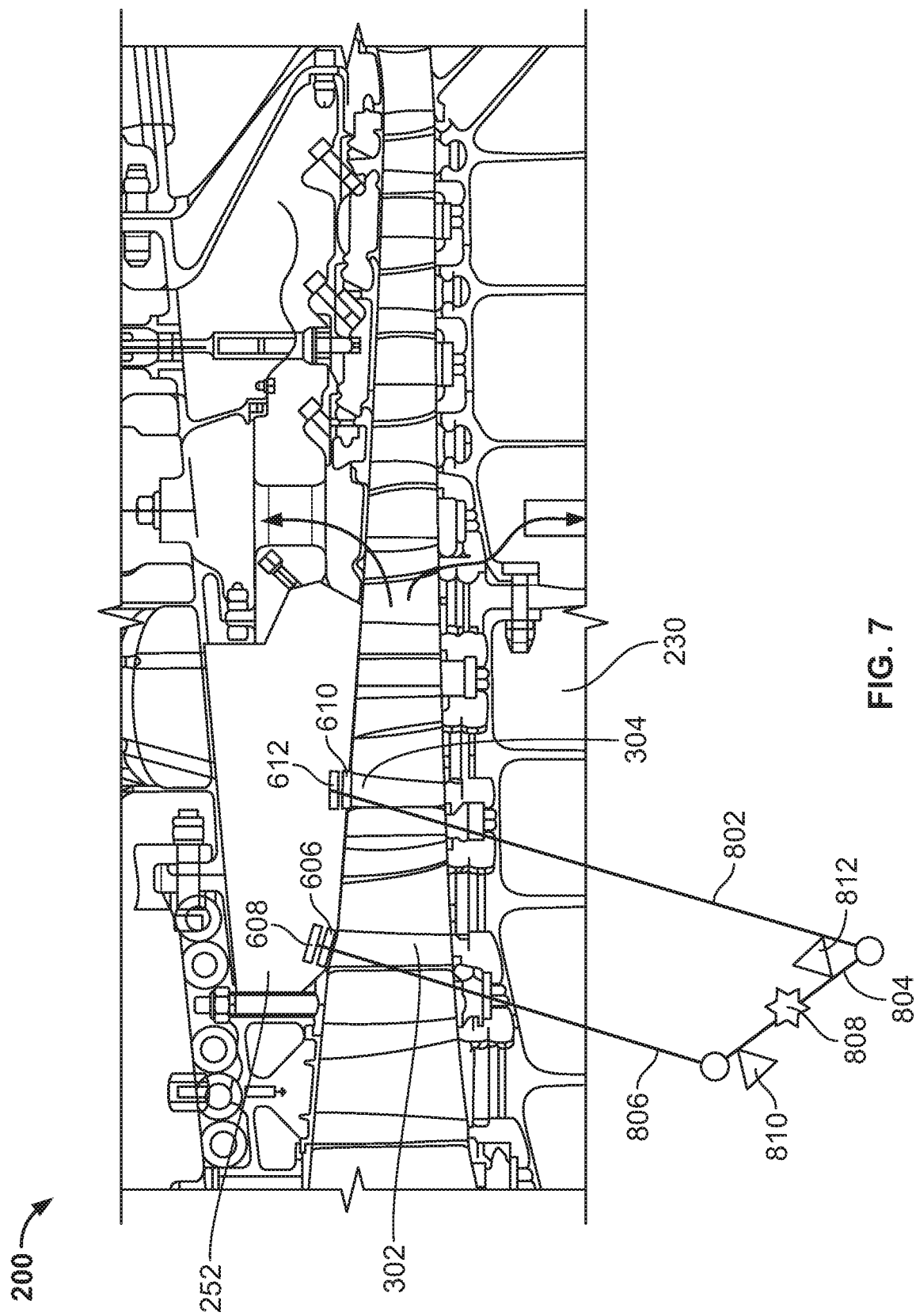
FIG. 7 shows example control rods coupled to the example valves where the control rods have positioned the valve to extract bleed air from the $4^{th}$ stage of the compressor.
Figure 8:
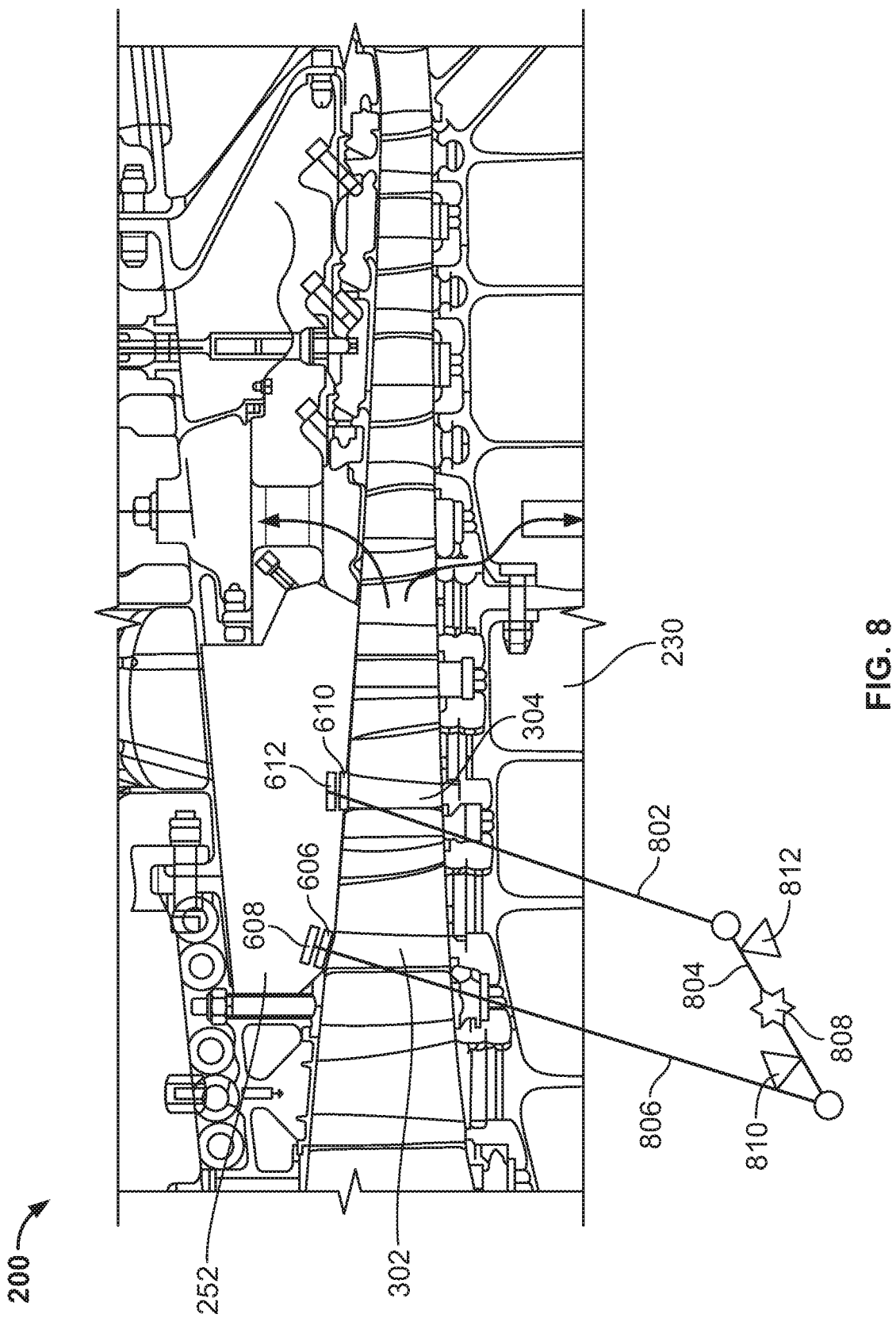
FIG. 8 shows the example control rods coupled to the example valves where the control rods have positioned the valve to extract bleed air from the $5^{th}$ stage of the compressor.
Figure 9:
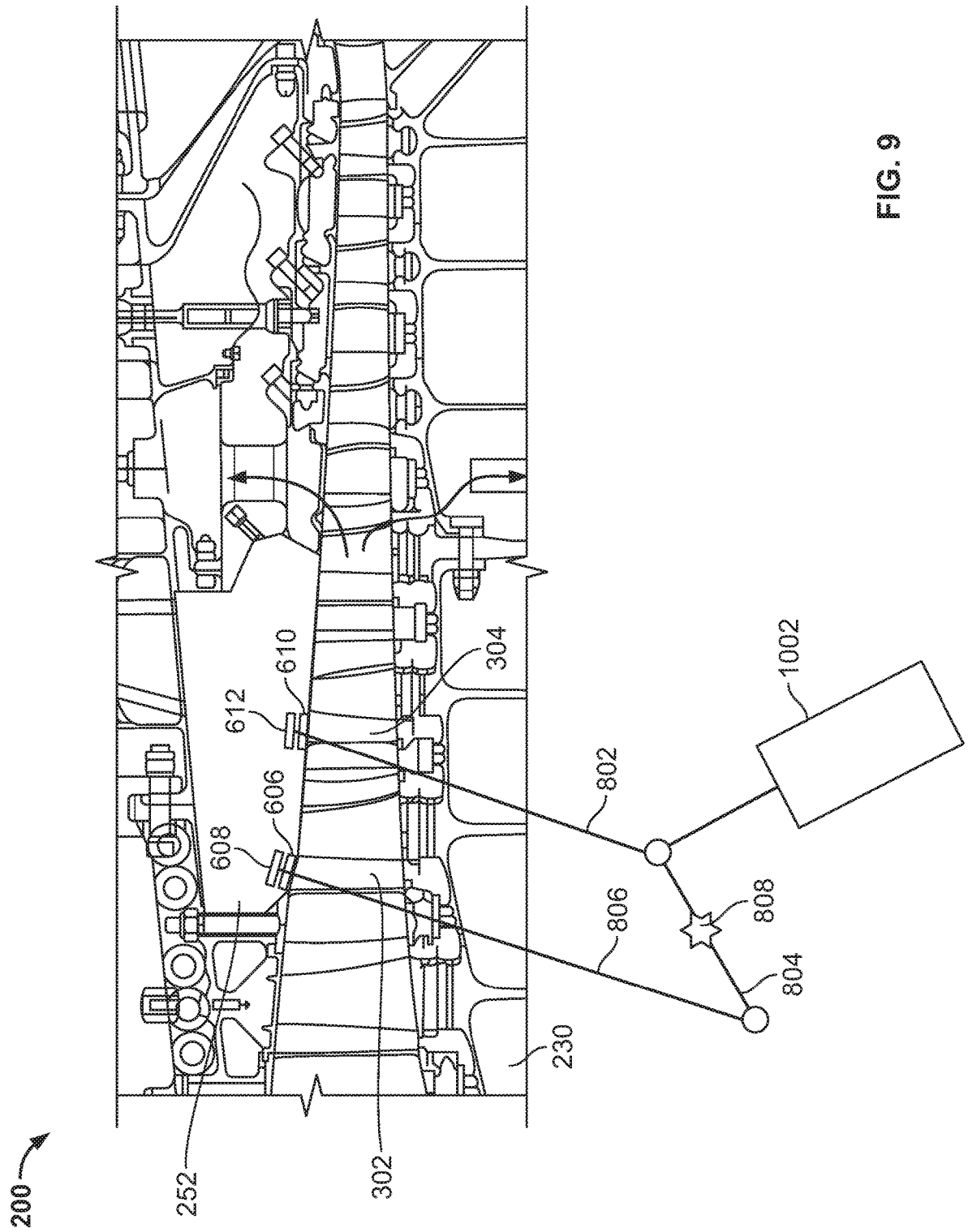
FIG. 9 shows an example actuator coupled to the control rods to actuate the example valves between a first position and a second position.

FIG. 7 shows control rods and/or linkage 802, 804, 806 coupled to the sleeves 608, 612 to move (e.g., simultaneously move and/or control) the sleeves 608, 612 to change an amount of fluid flow through the associated apertures and/or bleed ports 302, 304. In the illustrated example, the control rods 802, 804, 806 have moved the second sleeve 608 to enable fluid flow through the bleed port 304 corresponding to a fourth stage of the compressor 210 and have moved the fourth sleeve 612 to substantially stop fluid flow through the bleed port 302 corresponding to a fifth stage of the compressor 210. In some examples, the control rods 802, 804, 806 pivot about a pivot point 808 and can be locked in a particular position using locks and/or locking mechanism(s) 810, 812. FIG. 7 shows the sleeves 608, 612 in a position corresponding to a $4^{th}$ stage of the compressor 210 and FIG. 8 shows the sleeves 608, 612 in a position corresponding to a $5^{th}$ stage of the compressor 210. FIG. 9 shows the control rods 802, 804, 806 being actuated by an actuator 1002 that enables the position of the sleeves 608, 612 to be automatically adjusted. For example, the actuator 1002 may automatically adjust the sleeves 608, 612 while the engine 200 is running or prior to operating the engine 200.

Figure 10:
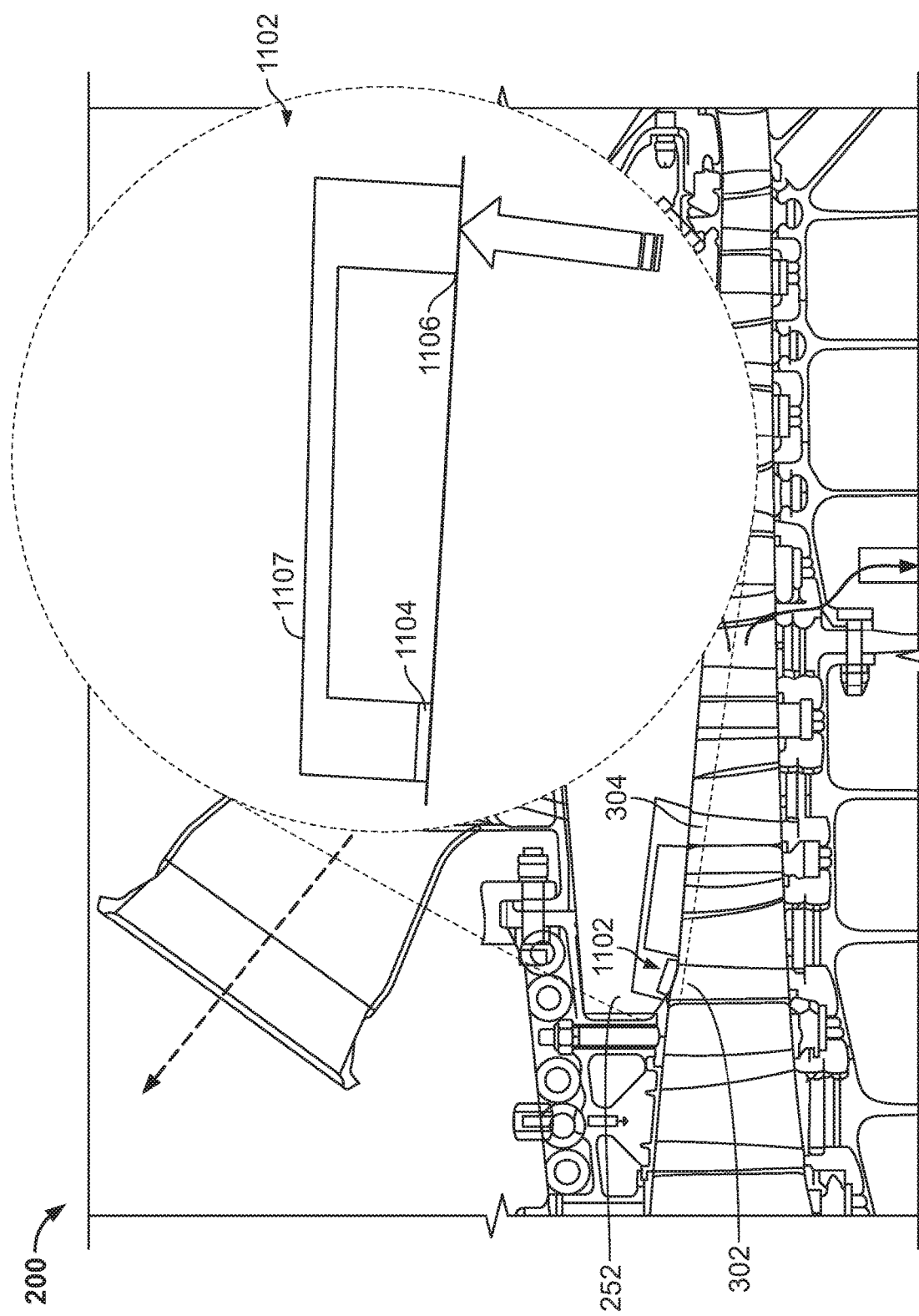
FIG. 10 shows an example bleed band apparatus used to control fluid flow through bleed ports in accordance with the teachings of this disclosure.
Figure 11:
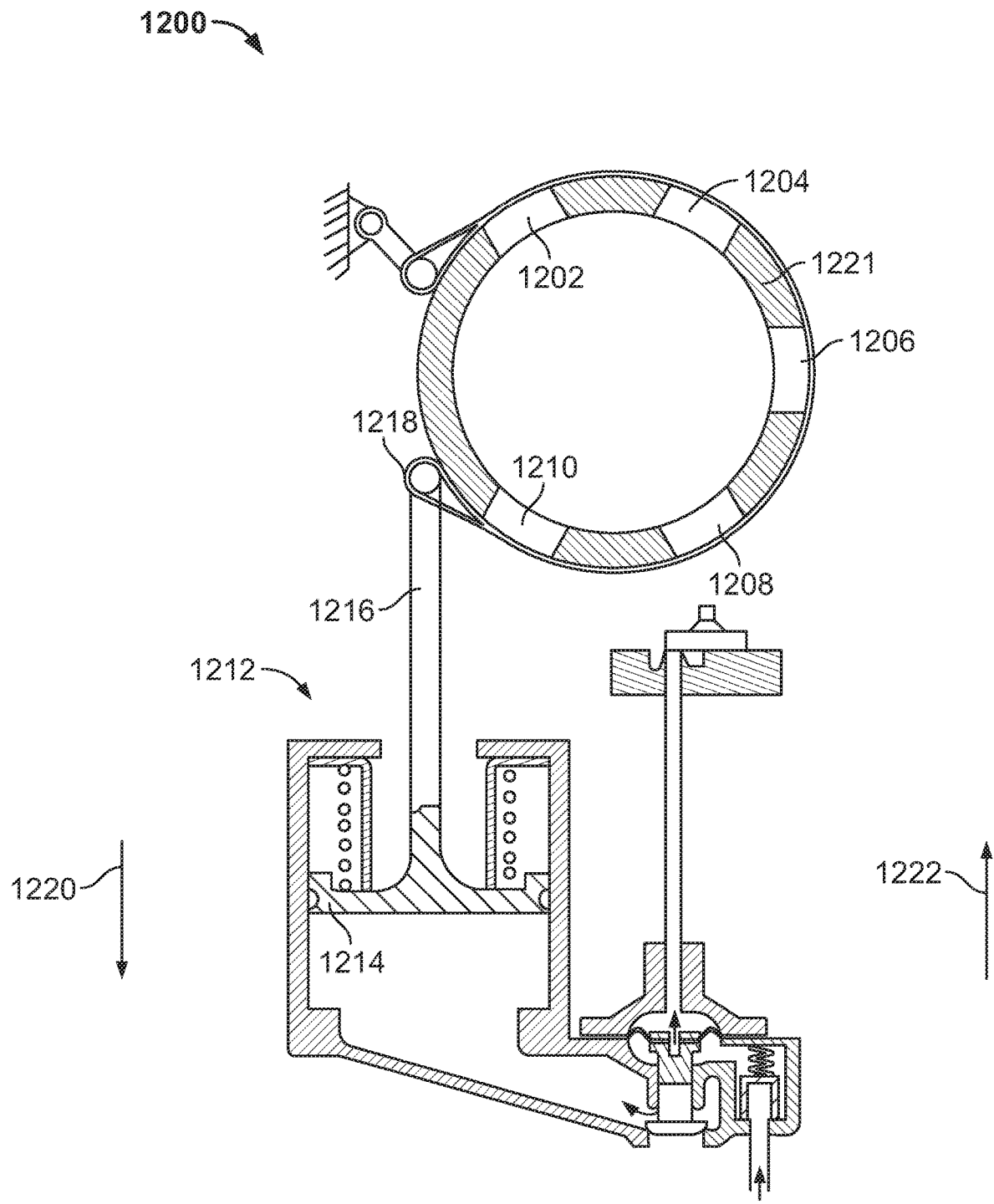
FIG. 11 shows another example bleed band apparatus used to control fluid flow through bleed ports in accordance with the teachings of this disclosure.
Figure 12:
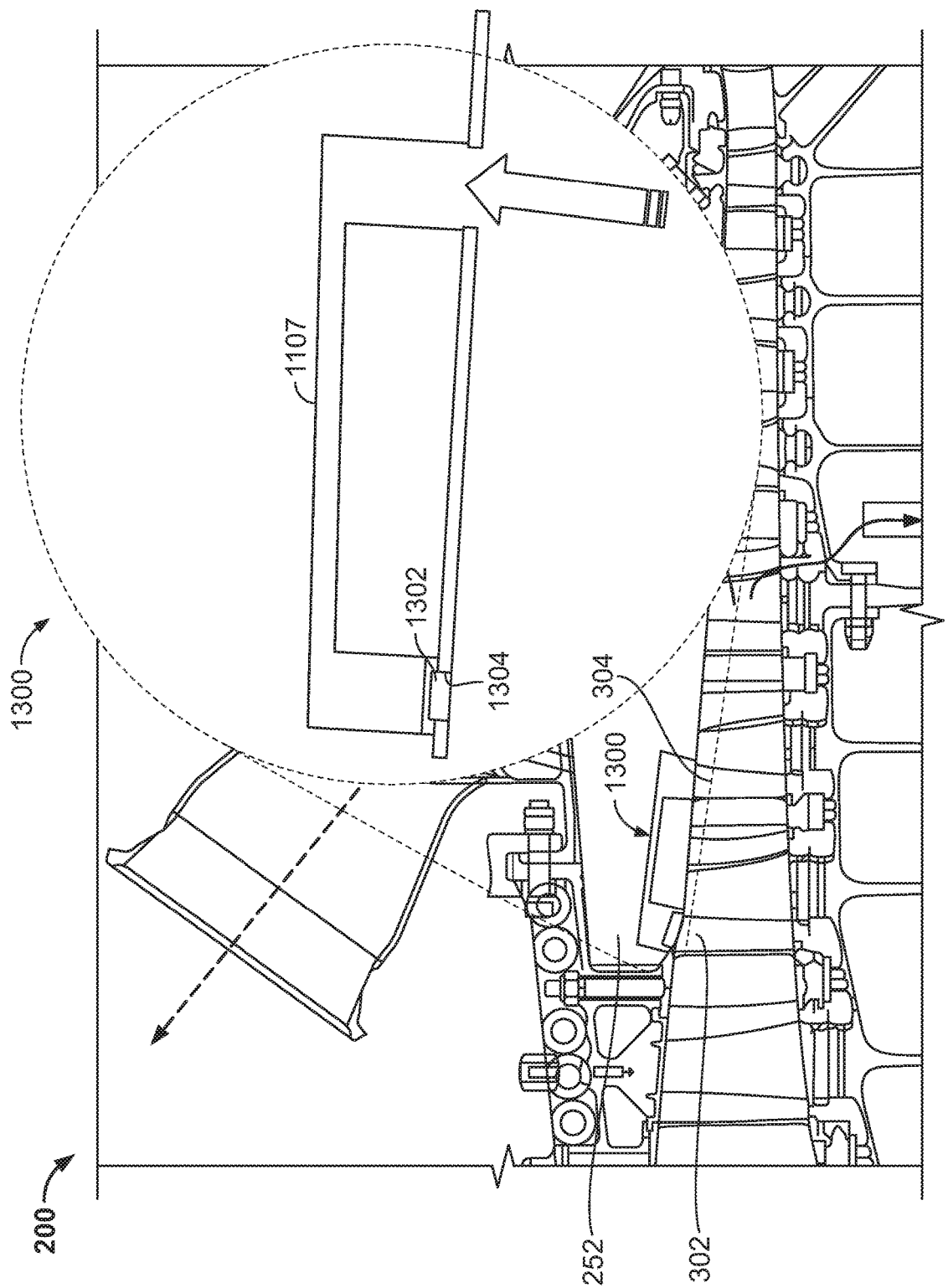
FIG. 12 shows an example bleed band apparatus having a plug(s) used to control fluid flow through bleed ports in accordance with the teachings of this disclosure.

In other examples and as shown in FIGS. 10, 11 and 12, the bleed port selection mechanism 250 is implemented as an example bleed band 1102 (e.g., belly band) positioned over one or more bleed ports 302, 304 to block and/or at least partially block the fluid flow through the respective bleed ports 302, 304. In some examples, the bleed band 1102 is movable down a length of a housing of a compressor to at least partially the block bleed port(s) 302, 304 at a particular stage (e.g., the $4^{th}$ stage). In some such examples, the bleed band 1102 is movable by loosening and/or relaxing the bleed band 1102 and thereafter moving the bleed band 1102 from a first position 1104 corresponding to a fourth stage of the compressor to a second position 1106 corresponding to a fifth stage of the compressor. Additionally or alternatively, example guides and/or guide bands may be provided to guide the movement of the bands relative to the compressor housing. Additionally or alternatively, in some examples, the bleed bands include discreet plugs and/or protrusions that align with compressor case holes to smooth the compressor flowpath and/or substantially eliminate and/or reduce disturbances generated by steps in the flowpath.

FIG. 10 shows the example compressor 210 and an example bleed band 1102 that can be used to implement the bleed port selection mechanism 250 of FIG. 2. The example bleed band 1102 can be moved between a first position and/or first location 1104 and a second position and/or second location 1106 using a slotted guide 1107. Depending on the position of the bleed band 1102, the bleed band 1102 controls fluid flow through the bleed ports 302, 304. To move the bleed band 1102 from the first position 1104, an operator may loosen the bleed band 1102 and move the bleed band 1102 through the guide 1107 until the bleed band 1102 is positioned adjacent the second bleed port 304. Once at the second position, the operator may tighten the bleed band 1102 about the compressor case 230.

FIG. 11 shows an example bleed band 1200 that can be used to implement the bleed port selection mechanism 250 of FIG. 2. FIG. 11 shows the example bleed band 1200 covering apertures 1202, 1204, 1206, 1208, 1210. FIG. 11 also shows an apparatus, regulator, actuator and/or valve 1212 used to control the position of the bleed band 1200. In the illustrated example, the apparatus 1212 includes a spring biased piston 1214 having a stem 1216 that is coupled to an end 1218 of the bleed band 1200. Moving the piston 1214 in a first direction generally indicated by arrow 1220 moves the bleed band 1200 away from a compressor 1221 and incrementally moves the bleed band 1200 from covering the apertures 1202, 1204, 1206, 1208, 1210. Having the bleed band not cover and/or to disposed at a distance from one or more of the apertures 1202, 1204, 1206, 1208, 1210 allows air flow and/or more air flow through the respective apertures 1202, 1204, 1206, 1208, 1210. Moving the piston 1214 in a second direction generally indicated by arrow 1222 moves the bleed band 1200 towards the compressor 1221 and incrementally moves the bleed band 1200 to cover the apertures 1202, 1204, 1206, 1208, 1210. Having the bleed band 1200 cover one or more of the apertures 1202, 1204, 1206, 1208, 1210 limits and/or prevents airflow through the respective apertures 1202, 1204, 1206, 1208, 1210.

FIG. 12 shows an example bleed band 1300 that can be used to implement the bleed port selection mechanism 250 of FIG. 2. In this example, the bleed band 1300 includes a plug and/or protrusion 1302 aligned with a compressor case hole 1304 to smooth the compressor flowpath and/or substantially eliminate and/or reduce flow disturbances generated by steps in the flowpath.

Figure 13:
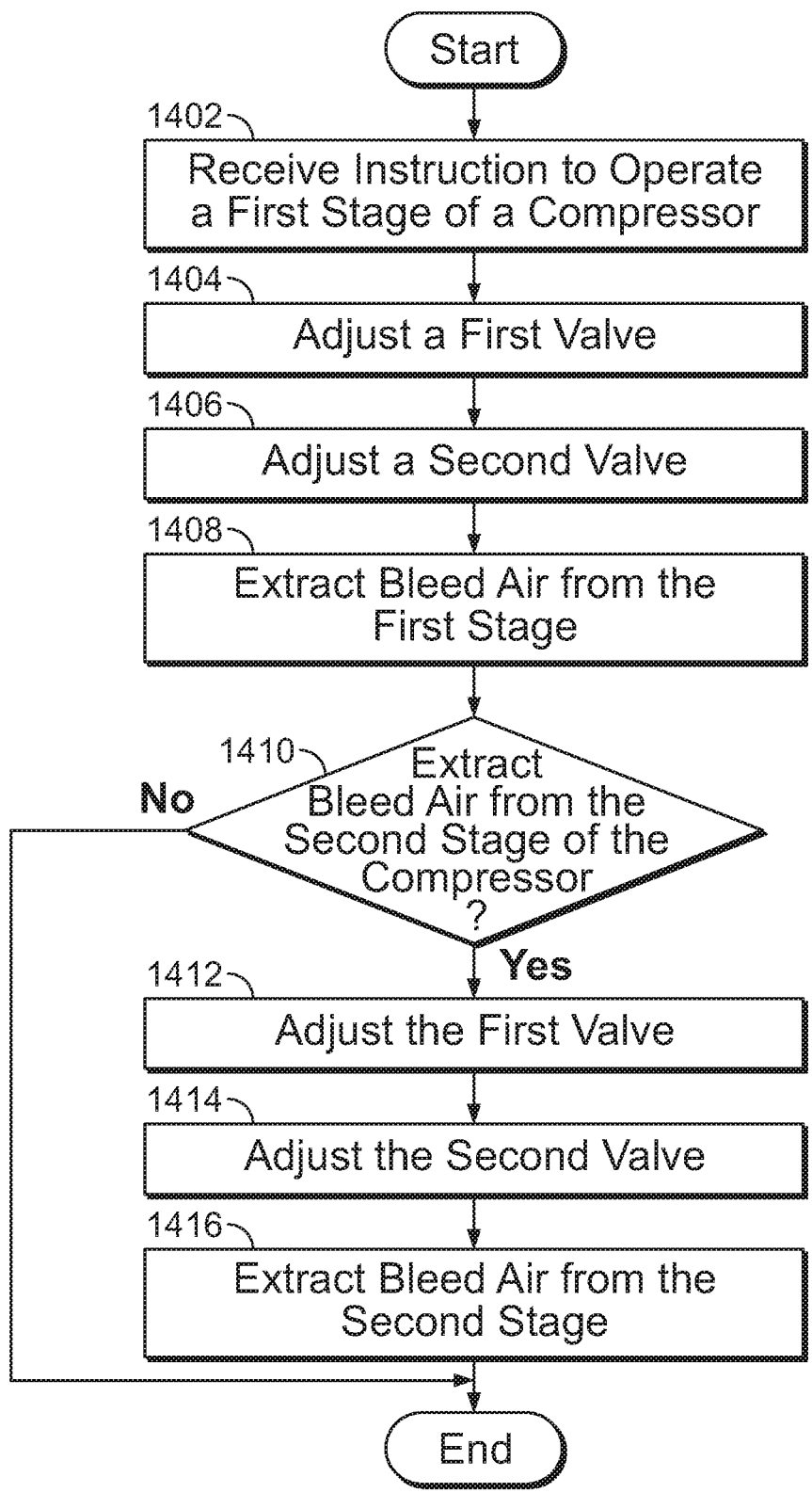
FIG. 13 is a flowchart that describes processes of implementing the examples disclosed herein.

FIG. 13 is a flow diagram representative of example operations (e.g., manual operations) that can be executed to implement the teachings of this disclosure. The example operations of FIG. 13 can be implemented using, for example, the bleed port adjustment apparatus 400, the valves 602, 604 and/or the bleed band 1102, 1200, 1300. While an example manner of implementing the examples disclosed herein is illustrated in FIG. 13, one or more of the elements, processes and/or devices illustrated in FIG. 13 may be combined, divided, re-arranged, omitted, eliminated and/or implemented in any other way.

The process of FIG. 13 begins at block 1402 where an instruction is received to extract bleed air from a first stage of a compressor and/or an engine (block 1402). In some examples, to enable bleed air to be extracted from the first stage, the first valve is adjusted (block 1404). In some examples, to enable bleed air to be extracted from the first stage, the second valve is adjusted (block 1406). For example, to adjust either of the first and/or second valves 602, 604, the first and/or second sleeves 402, 404, 606, 608, 610, 612 can be moved relative to the apertures 406, 408, 410, 412 and/or bleed ports 302, 304 to enable fluid flow through one or more apertures 406, 408, 410, 412 and substantially prevent fluid flow through one or more of the other apertures 406, 408, 410, 412. After the valves are in position, the bleed air may be extracted from the first stage of the compressor (block 1408).

At block 1410, it is determined whether or not to extract bleed air from a second stage of the compressor and/or the engine (block 1410). If an instruction is received to extract bleed air from the second stage, the first valve is adjusted (block 1412). If an instruction is received to extract bleed air from the second stage, the second valve is adjusted (block 1414). After the valves are in position, the bleed air may be extracted from the second stage of the compressor (block 1416). While this example describes adjusting first and second valves, in other example, a single valve implemented as a bleed band may be used and/or moved to control fluid flow through the bleed ports associated with the first and second stages.

The examples disclosed herein enable an engine bleed to be extracted from one of two high pressure configurations.

In some examples, the bleed stage may be selected manually prior to operating the engine and/or automatically while the engine is operating at idle. In some examples, the disclosed examples enable an engine to be configured to substantially match airplane environment control system requirements with substantially no impact on an engine airplane interface.

In some examples, using the examples disclosed herein, a lower more energy efficient compressor stage can be selected for an aircraft having a relatively low occupant count and a higher compressor stage can be selected for an aircraft with a higher equivalent occupant count.

Using the disclosed examples, an operator and/or mechanic can select the bleed stage prior to flight based on, for example, the number of passengers, crew rests, heating and/or cooling systems, other areas requiring engine bleed air, etc. In some examples, the same plenum can be used for different bleed stages because the bleed port adjustment apparatus can control the fluid flow through the different stages and the plenum is positioned on the stages. In some examples, the examples disclosed herein enable one stage (e.g., a fourth stage) of the compressor to be opened up to the plenum and another stage (e.g., a fifth stage) of the compressor to be isolated and/or closed off from the plenum. In some examples, engines can be produced including the examples disclosed herein to improve performance and provide a greater number of options.

In some examples, a high pressure compressor (HPC) low stage bleed port is the lowest stage that meets airplane pressure requirements during a cruise phase of a mission for all equivalent occupant counts. In some examples, the optimum and/or preferred stage is between two stages. In such examples, the higher stage is typically selected resulting in a fuel burn penalty for airlines that order airplanes with low equivalent occupant counts. The examples disclosed herein enable an operator and/or a mechanic to manually and/or automatically configure the bleed port(s) to, for example, a fourth stage and a fifth stage. Thus, the examples disclosed herein improve engine performance by allowing customers/users to select the optimum bleed stage as opposed to an otherwise more conservative stage that would meet airplane bleed requirements of the particular aircraft.

From the foregoing, it will appreciated that the above disclosed methods and apparatus relate to selecting a bleed stage for a high pressure compressor of a turbofan engine where the apparatus is configured to enable selection of a bleed stage without replacement of the bleed plenum and/or off takes of the engine bleed system. In some examples, and as described in connection with FIGS. 7-9, the apparatus is further configured to actuate one bleed stage OFF responsive to actuating another bleed stage ON.

As set forth herein, an example apparatus for bleeding air from a multi-stage compressor of an aircraft engine is disclosed. The example apparatus includes a compressor case including a plurality of bleed ports. A first bleed port is associated with a first stage of a compressor, and a second bleed port associated with a second stage of the compressor. The example apparatus includes a plenum connected to the compressor case to define a plenum cavity. The plenum fluidly coupling the first and second bleed ports to a fluid conduit for providing bleed air to one or more systems of an aircraft. The example apparatus includes a bleed port selection mechanism located within the plenum cavity. The bleed port selection mechanism includes a first portion proximate the first bleed port and operable to prevent fluid flow through the first bleed port.

In some examples, the bleed port selection mechanism also includes a second portion proximate the second bleed port and operable to prevent fluid flow through the second bleed port. In some examples, at least one of the first portion or the second portion includes a sleeve, where the sleeve includes an aperture movable relative to the compressor case. In some examples, at least one of the first portion or the second portion includes a pair of concentric sleeves. A first sleeve of the pair of concentric sleeves is movable relative to a respective bleed port associated therewith and the second sleeve of the pair of concentric sleeves is stationary relative to the respective bleed port. In some examples, the apparatus also includes a seal between the first sleeve and the second sleeve to substantially prevent fluid flow between the first sleeve and the second sleeve. In some examples, the seal includes a labyrinth seal.

In some examples, the apparatus also includes an actuator associated with at least one of the first portion or the second portion. The actuator is configured to move the at least one of the first portion and the second portion relative to respective one of the first bleed port or the second bleed port. In some examples, the first portion is controllable independently from the second portion. In some examples, the apparatus also includes a linkage coupled to the first portion and to the second portion to enable substantially simultaneous control of the first portion and the second portion.

In some examples, the apparatus also includes a locking mechanism to secure the linkage in a position. In some examples, the first portion is movable between a first position in which the first portion is associated with the first bleed port to a second position in which the first portion is associated with the second bleed port. In some examples, the apparatus includes a guide between the first position and the second position.

Another example apparatus includes a compressor of a turbofan engine. The compressor includes a compressor case including a first aperture. The apparatus also includes a bleed band including a first end and a second end. The bleed band is to at least partially surround the compressor case. The apparatus also includes an actuator coupled to the first end of the bleed band. The actuator is to move the first end between a first position in which the bleed band at least partially covers the first aperture to substantially prevent fluid flow through the first aperture to a second position in which the bleed band is disposed a distance apart from the first aperture to enable fluid flow through the first aperture.

In some examples, the bleed band also includes a protrusion configured to be received in the first aperture when the bleed band is in the first position. In some examples, the first aperture is associated with one of a plurality of stages of the compressor. The compressor case includes a second aperture associated with another one of the plurality of stages of the compressor. The bleed band is movable between a first location associated with the first aperture to a second location associated with the second aperture.

An example method for selecting a bleed stage of an engine of an aircraft is disclosed. The example method includes flowing fluid through a compressor of the engine. The compressor includes a first compressor stage, a second compressor stage, a compressor case surrounding the compressor and first and second bleed ports associated with the first and second compressor stages, respectively. The method also includes bleeding at least a portion of said fluid through the first bleed port or the second bleed port into a plenum fluidly coupling the first and second bleed ports to a system of the aircraft. The method also includes actuating a bleed port selection mechanism disposed within the plenum to at least partially prevent fluid flow through one of the first bleed port or the second bleed port without affecting fluid flow through the other one of the first bleed port or the second bleed port.

In some examples, the bleed port selection mechanism includes a first valve associated with the first bleed port. Actuating the bleed port selection mechanism includes moving a first aperture of the first valve out of alignment with the first bleed port. In some examples, the bleed port selection mechanism also includes a second valve associated with the second bleed port. Actuating the bleed port selection mechanism also includes moving the first aperture into alignment with the first bleed port and covering the second bleed port with the second valve. In some example, actuating the bleed port selection mechanism occurs while the engine is idling. In some examples, the bleed port selection mechanism includes a sleeve. Actuating the bleed port selection mechanism includes moving the sleeve between a first location in which the sleeve covers the first bleed port and a second location in which the sleeve covers the second bleed port.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A method to extract bleed air from an aircraft engine, the method comprising:
extracting, via a plenum positioned in a compressor of the aircraft engine, bleed air from a first bleed port associated with a first stage of a compressor and a second bleed port associated with a second stage of the compressor, the plenum configured to combine the extracted bleed air from the first and second bleed ports and fluidly couple the extracted bleed air to one or more systems of an aircraft; and
regulating a pressure of the extracted bleed air in the plenum by adjusting a flow of bleed air through the first bleed port via a first valve associated with the first bleed port and adjusting a flow of bleed air through the second port via a second valve associated with the second bleed port, the first valve including a first pair of sleeves and the second valve including a second pair of sleeves, and the regulating of the pressure of the extracted bleed air includes moving at least one of the first pair of sleeves to control the flow of bleed air through the first bleed port or the second pair of sleeves to control the flow of bleed air through the second bleed port.

2. The method of claim 1, further including controlling the first valve and the second valve simultaneously to adjust the flow of bleed air through the respective first and second bleed ports to regulate the pressure of the extracted bleed air in the plenum.

3. The method of claim 1, further including controlling the first valve independently relative to the second valve to adjust the flow of bleed air through the respective first and second bleed ports to regulate the pressure of the extracted bleed air in the plenum.

4. The method of claim 1, wherein the first stage provides bleed air having a first pressure and the second stage provides bleed air having a second pressure, the second pressure being greater than the first pressure, and wherein regulating the pressure of the extracted bleed air includes regulating the pressure such that pressure of the extracted bleed air within the plenum is between the first pressure and the second pressure.

5. The method of claim 1, wherein regulating the pressure of the extracted bleed air in the plenum occurs during operation of the aircraft engine.

6. The method of claim 1, wherein the first stage provides bleed air having a first pressure and the second stage provides bleed air having a second pressure, the second pressure being higher than the first pressure, and further including moving the first valve towards a closed position to restrict bleed air from the first bleed port to the plenum and simultaneously moving the second valve towards an open position to allow bleed air from the second bleed port to the plenum to increase the pressure of the extracted bleed air in the plenum.

7. An apparatus for bleeding air from a multi-stage compressor of an aircraft engine, the apparatus comprising:
a compressor including a first bleed port and a second bleed port, wherein the first bleed port is associated with a first stage of a compressor and a second bleed port is associated with a second stage of the compressor;
a fluid conduit to channel bleed air from at least one of the first bleed port or the second bleed port to one or more systems of an aircraft;
a bleed port selection mechanism proximate the first bleed port and the second bleed port, the bleed port selection mechanism including a first valve having a first pair of sleeves associated with the first bleed port to control fluid flow from the first bleed port to the fluid conduit, and a second valve having a second pair of sleeves associated with the second bleed port to control fluid flow from the second bleed port to the fluid conduit; and
a control system configured to:
extract bleed air from at least one of the first bleed port associated with the first stage of the compressor or the second bleed port associated with the second stage of the compressor via the bleed port selection mechanism, the bleed port selection mechanism configured to combine the extracted bleed air from the first and second bleed ports; and
regulate a pressure of the extracted bleed air by adjusting a flow of bleed air through the first bleed port and the second port, wherein the adjusting of the flow of bleed air through the first bleed port and the second bleed port includes moving at least one of the first pair of sleeves to control a flow of bleed air through the first bleed port or the second pair of sleeves to control a flow of bleed air through the second bleed port.

8. The apparatus of claim 7, wherein the first pair of sleeves includes a first sleeve and a second sleeve, the first sleeve being concentric relative to the second sleeve, and wherein the first sleeve includes a first aperture and the second sleeve includes a second aperture.

9. The apparatus of claim 8, wherein the first sleeve is to move relative to the second sleeve between a first position at which the first aperture and the second aperture align to enable fluid flow from the first bleed port to the fluid conduit, and a second position at which the first aperture is not aligned with at least one of the second aperture or an outlet of the first bleed port to restrict fluid flow from the first bleed port to the fluid conduit.

10. The apparatus of claim 7, wherein the second pair of sleeves includes a third sleeve and a fourth sleeve, the third sleeve being concentric relative to the fourth sleeve, and wherein the third sleeve includes a third aperture and the fourth sleeve includes a fourth aperture.

11. The apparatus of claim 10, wherein the third sleeve is to move relative to the fourth sleeve between a first position at which the third aperture and the fourth aperture align to enable fluid flow from the second bleed port to the fluid conduit, and a second position at which the third aperture is not aligned with at least one of the fourth aperture or an outlet of the second bleed port to restrict fluid flow from the second bleed port to the fluid conduit.

12. The apparatus of claim 7, further comprising an actuator associated with at least one of the first pair of sleeves or the second pair of sleeves, the actuator configured to move the at least one of the first pair of sleeves or the second pair of sleeves relative to the first bleed port or the second bleed port, respectively.

13. The apparatus of claim 7, wherein the first pair of sleeves is controllable independently from the second pair of sleeves.

14. The apparatus of claim 7, further comprising a linkage assembly coupled to the first pair of sleeves and the second pair of sleeves to enable simultaneous control of the first pair of sleeves and the second pair of sleeves.

15. An apparatus, comprising:
a compressor case including a first bleed port associated with a first stage of a compressor and a second bleed port associated with a second stage of the compressor;
a plenum connected to the compressor case to define a plenum cavity, the plenum fluidly coupling the first and second bleed ports to a fluid conduit to provide bleed air to one or more systems of an aircraft; and
a bleed port selection mechanism located within the plenum cavity, the bleed port selection mechanism including a first valve associated with the first bleed port and a second valve associated with the second bleed port, the first valve including a first sleeve and a second sleeve, the first sleeve having a first aperture and the second sleeve having a second aperture, the bleed port selection mechanism is to move at least one of the first sleeve or the second sleeve relative to the other one of the first sleeve of the second sleeve between:
a first position to align the first aperture and the second aperture, alignment of the first aperture and the second aperture to provide a first flow path to allow bleed air to flow from the first bleed port to the plenum cavity;
a second position to offset the first aperture relative to the second aperture to block the first flow path to prevent flow of bleed air from the first bleed port to the plenum cavity;
a control system configured to:
extract bleed air from at least one of the first bleed port associated with the first stage of the second compressor or the second bleed port associated with the second stage of the compressor via the bleed port selection mechanism, the bleed port selection mechanism configured to combine the extracted bleed air from the first and second bleed ports; and
regulate a pressure of the extracted bleed air in the plenum by adjusting a flow of bleed air through the first bleed port via the first valve associated with the first bleed port and adjusting a flow of bleed air through the second port via the second valve associated with the second bleed port, wherein the adjusting of the flow of bleed air through the first bleed port via the first valve includes moving the at least the first sleeve or the second sleeve relative to the other one of the first sleeve or the second sleeve.

16. The apparatus of claim 15, further including a first actuator operatively coupled to at least one of the first sleeve or the second sleeve and controllable via the control system, the first actuator to move the at least the first sleeve or the second sleeve relative to the other one of the first sleeve or the second sleeve to cause the first aperture to align with the second aperture.

17. The apparatus of claim 15, wherein the second valve including a third sleeve and a fourth sleeve, the third sleeve having a third aperture and the fourth sleeve having a fourth aperture, the bleed port selection mechanism is to move at least one of the third sleeve or the fourth sleeve relative to the other one of the third sleeve of the fourth sleeve between:
a third position to align the third aperture and the fourth aperture, alignment of the third aperture and the fourth aperture to provide a second flow path to fluidly couple bleed air to flow from the second bleed port to the plenum cavity; and
a fourth position to offset the third aperture relative to the fourth aperture to block the second flow path to prevent flow of bleed air from the second bleed port to the plenum cavity.

18. The apparatus of claim 17, wherein the control system is configured to move the at least the third sleeve or the fourth sleeve relative to the other one of the third sleeve or the fourth sleeve to regulate a pressure of the bleed air in the plenum by adjusting a flow of bleed air through the second bleed port via the second valve associated with the second bleed port.

19. The apparatus of claim 18, further including an actuator operatively coupled to the first valve and the second valve and controllable via the control system, the actuator to move the at least one of the first sleeve or the second sleeve relative to the other one of the first sleeve or the second sleeve and at least one of the third sleeve or the fourth sleeve relative to the other one of the third sleeve or the fourth sleeve to regulate the pressure of the bleed air in the plenum.

20. The apparatus of claim 19, wherein the actuator is operatively coupled to the at least one of the first sleeve or the second sleeve via a first linkage and the at least one of the third sleeve and the fourth sleeve via a second linkage, and further including a third linkage to operatively couple the first linkage and the second linkage.

* * * * *